United States Patent

[11] 3,587,895

| [72] | Inventor | Andrew T. Kornylak<br>Hamilton, Ohio |
|---|---|---|
| [21] | Appl. No. | 709,521 |
| [22] | Filed | Jan. 30, 1968 |
| [45] | Patented | June 28, 1971 |
| [73] | Assignee | Kornylak Corporation<br>Hamilton, Ohio<br>Continuation-in-part of application Ser. No. 398,146, Sept. 8, 1964, now abandoned. |

[54] MATERIAL HANDLING SYSTEM
8 Claims, 18 Drawing Figs.

[52] U.S. Cl. .................................................. 214/623
[51] Int. Cl. .................................................. B65g 47/00
[50] Field of Search .......................................... 214/623,
624, 16.4, 16.12, 16.12 (B), 16.14 (B); 198/20,
34, 105, 127, 154, 158

[56] References Cited
UNITED STATES PATENTS

| 1,793,062 | 2/1931 | Collier | 198/158 |
|---|---|---|---|
| 3,122,232 | 2/1964 | Burt | 198/127 |
| 3,225,893 | 12/1965 | Currie | 198/127 |
| 3,263,797 | 8/1966 | Lutes | 198/127 |
| 826,702 | 7/1906 | Younkman | 198/158 |
| 1,020,746 | 3/1912 | Dehler | 198/120 |
| 2,310,461 | 2/1943 | Regan et al. | 214/11 |
| 2,972,423 | 2/1961 | Thurnher | 214/16.4 |

Primary Examiner—Gerald M. Forlenza
Assistant Examiner—RAymond B. Johnson
Attorney—Harold L. Halpert

ABSTRACT: A Material Handling System comprises a horizontal conveyor and an elevator. An oscillating conveyor removes an article from the horizontal conveyor and loads it onto a carrier flight or tray on a constantly moving elevator or vertically moving flight conveyor, or receives an article from the elevator and transfers it to the horizontal conveyor. The oscillating conveyor is caused to move concomitantly with the elevator carrier in either loading or unloading direction and is automatically stopped and positioned for the next cycle of operation for loading or unloading the elevator. The articles are forwarded to the horizontal conveyor from a store or supply thereof by means of a trip mechanism operated by the oscillating conveyor at end of the oscillating path thereof under the horizontal conveyor, completing one cycle of operation. In unloading, the articles are forwarded by the oscillating conveyor to suitable receiving means.

INVENTOR.
ANDREW T. KORNYLAK
BY
C. Chandlee Pidgeon
AGENT.

MATERIAL HANDLING SYSTEM

This application is a continuation-in-part of my application Ser. No. 398,146, filed Sept. 8, 1964, now abandoned.

This invention relates to a Material Handling System, and more particularly to a system of conveyors and a continuously moving elevator or vertical flight conveyor for transferring material from an assembly or storage area on one level to a storage, distributing or shipping area on the same or another level. The system is further adapted to deliver articles or loads from the elevator to a conveyor system at any desired level, both receiving and delivery being on one side only of the elevator.

An object of this invention is the provision of a system of conveyors for conveying discrete articles from an assembly or storage area having means to change the direction of travel of the articles and place them in position to be placed on an elevator having a plurality of continuously moving carriers thereon circulating in an endless path.

Another object of this invention is the provision of means for placing articles on a carrier of an elevator or removing articles therefrom including a power driven rollerway adjacent the elevator and a normally inactive rollerway on the carrier which is powered by the adjacent power driven rollerway to move an article onto or from the carrier.

Another object of this invention is the provision of means for continuously feeding articles toward a continuously moving elevator and for transferring the articles one by one to a carrier on the elevator.

It is also an object of this invention to provide means for continuously removing articles from a continuously moving elevator in either direction of travel thereof.

An additional object of this invention is the provision of an elevator comprising an endless flexible element traveling in a closed path and supporting a plurality of carrier flights or trays, each having means thereon for applying power thereto to load articles thereon or to remove them therefrom, said power being supplied by a cooperating conveyor operating adjacent to said carriers.

A further object of this invention is the provision of an elevator having a continuously moving carrier comprising a series of substantially parallel fingers each finger comprising a normally inactive rollerway some of which may be powered, while moving, by a power driven rollerway which delivers an article to the carrier.

Another object of this invention is the provision of an elevator having a plurality of carriers each comprising a plurality of fingerlike rollerways having means to prevent rotation of the rollers thereof, but which may be powered by an adjacent power driven rollerway delivering an article thereto or receiving an article therefrom.

A further object of this invention is the provision of an elevator having a plurality of carriers traveling in an endless path, each carrier comprising a plurality of substantially parallel fingerlike rollerways.

An additional object of this invention is the provision of an elevator having fingerlike rollerway carriers and means for intermittently placing articles on the carrier thereof at one level and means interdigitating with the carriers at another level for removing the articles from the fingerlike rollerways.

A further object of this invention is the provision of an elevator having a plurality of carriers traveling in an endless path, each comprising a suitable tray having conveyor rollers thereon, and novel means to supply power to drive at least some of the conveyor rollers to move an article thereon or therefrom.

Another object of this invention is the provision of an elevator having a plurality of carriers traveling in an endless path, each carrier comprising a plurality of fingerlike normally inactive rollerways, and a rollerway interdigitating with the fingerlike rollerways for removing articles therefrom.

An additional object of this invention is the provision of means in a roller conveyor section for arresting the movement of articles to let them pass one by one to a continuously moving elevator carrier which travels in an endless path.

Another object of this invention is the provision of a pair of intersecting conveyors for changing the direction of travel of articles to a path substantially normal to the original direction of travel.

Still another object of this invention is the provision of an elevator carrier continuously moving in an endless path, and a vertically oscillatable conveyor operating concomitantly with a carrier, signal emitting means on the carrier and transducer means on the conveyor, and power means controlled by the transducer means for causing oscillation of the conveyor.

These and other objects may become apparent upon consideration of the accompanying drawings which taken with the following specification comprise a complete disclosure of the invention.

In the drawings, wherein like characters of reference indicate like elements throughout the several views:

FIG. 18 is a diagrammatic representation of the operation of a carrier and oscillating conveyor with no physical connection therebetween.

Referring now to the drawings, and particularly to FIGS. 1 to 4, the material handling system 20 of this invention comprises a loader and/or unloader assembly 21 which changes the path of travel of articles, said articles being moved thereby, through an angle of substantially 90°; pickoff conveyor 21' and transfer conveyor 22 which transfers articles from the conveyor 21' to the elevator 23. The conveyors 21, 21' and 22 include frame members 24, 25 and 26 and standards 27 and 28. Frames 24, 25 and 26 have legs 29, 30 and 31, shown and others, not shown.

Associated with a loader assembly 21 is a single package forwarding means on escapement 32 which prevents overloading of the loader assembly 21. Articles are supplied, from manufacture or storage, to the single package forwarding conveyor 32 by means of any suitable conveyor here shown as a gravity type rollerway 33.

The pickoff conveyor 21' comprises a plurality of standards or bearing blocks 34 mounted on frames 24 and 56'. The frames 24 and 56' are supported on legs 29, 30 and 31. Each bearing block 34 is provided with a suitable bearing for the trunnion 35 on each of the rollers 36. The rollers 36 are substantially parallel and are suitably spaced to accommodate fingers 37 of the rollerways 38 and the fingers 39 of rollerways 40 on the transfer conveyor 22. The rollerways 38 and 40 are therefore formed to interdigitate with the rollers 36.

The loader and/or unloader assembly 21 has rollerways 41 and 42 in line with the rollerways 38 and 40, respectively. The fingers and rollerways above referred to are mounted in a frame 43 which is pivoted on axes 210, mounted in bosses 211 on the frames 25 and 26 in line with the axis of the power driven roller 44. The rollers 45 on rollerways 37 and 41 are idle rollers. The rollers 46 on rollerways 40 and 42 are power driven by means now to be described. The rollerways 38 and 40 are mounted on a plate 213, and the rollerways 41 and 42 are mounted on a plate 214. Plates 213 and 214 are mounted on box members 212 so that the whole frame 43 with rollerways 38, 40, 41 and 42 can pivot as a unit.

The roller 44 is mounted on a shaft 44' which rotates in suitable bearings on bearing blocks 47. A sprocket 48 is mounted on one end of the shaft 44' and is driven by a chain 49 from a sprocket 50 mounted on a shaft 51 connected by suitable reduction gears 52 to the motor 86 mounted on a frame member 53. Suitable, known means are provided for rotating the shaft 51 in either direction so that the rollers 44 and 68 may be rotated in either direction as desired and as indicated by the arrows R on FIG. 1. Suitable tension is applied to the chain 49 by means of an idler roller 54 mounted on an arm 55 adjustably mounted on a frame member 56. Power is thus applied to the roller 44. The roller 44 contacts idler rollers 57 on rollerways 40 and idler rollers 58 on rollerways 42. Intermediate the rollers 46 are additional idler rollers 59. Each roller 45, 46, 57, 58 and 59 is provided with suitable antifriction bearings 60. The antifriction bearing 60 includes a sleeve not shown mounted on a short trunnion 62, which projects through the frame 43. The trunnion 62 has a circumferential groove not shown to accommodate a spring or springs 64. The spring 64 may be a long wire spring engaging the trunnions 62 of the several rollers 46, 57, 58 and 59, or there may be several springs each engaging under the trunnion 62 on a roller 59 and over the trunnions 62 on the two adjacent rollers 46. The rollers 57, 58 and 59 are mounted in oversize openings 200 in the frame 43 so that they are free to move toward the rollers 44 and 46, respectively. By means of the pressure exerted against the rollers 57, 58 and 59 the torque of the roller 44 is transmitted to the rollers 46. This driving means is shown in more detail in the U.S. Pat. to Harry L. Lutes No. 3,263,797, issued Aug. 2, 1966 and assigned to the assignee of this application.

A gear 170 on the trunnion 44' adjacent the sprocket 48 meshes with a gear 171 on the shaft 172 mounted between rollerways 41 and 42. A sprocket 173 is also mounted on the shaft 172. A chain 66 connects the sprocket 173 with a sprocket 65 on the shaft 67 on which is mounted a roller 68. The roller 68 engages below the end rollers 46 on the rollerways 42. This provides a power assist at the end of the transfer or takeoff conveyor 22.

A single package escapement 32 is located adjacent the receiving end of pickoff conveyor 21' which accepts articles from conveyor system 33. The single package escapement 32 includes a frame noted generally as 69 supporting a rockable frame 70, which rocks about a pivot 71 comprising the axis of a freely rotatable roller 72. The frame 70 carries a roller 73 having a shaft 74. The trunnion 74 moves in a slot 75, in the frame 69. At the end of the rocking frame 70 there is a package stop 76. A roller 77, having a shaft 78 is mounted on the frame 69. A sprocket 79 is mounted on the shaft 78 and a chain 80 is trained thereover and passes over a sprocket 81 on the shaft 74. An additional sprocket 82 is mounted on the shaft 78 and a chain 83 passes thereover to a sprocket 84 on a shaft 85 mounted on the frame 69. A motor 86 is mounted on frame member 87 and the shaft 88 thereof carries a sprocket 89 which moves a chain 90 to drive the sprocket 91 on the input shaft 92 of a reduction gear 52. A sprocket 177 is mounted on the output shaft 51 of reduction gear 52 on the opposite side from sprocket 50. A chain 178 connects sprocket 179 on the gear box 93 with sprocket 50' on the reduction gear 52. Sprocket 179 is mounted on the input shaft of gear box 93. The shaft 94 of the gear box 93 has a sprocket 95 thereon. A chain 96 passes about the sprockets 95 and 84 to apply power to the rollers 73 and 77. An L-shaped arm 97 is mounted on the rockable frame 70 and carries at the free end of the L a roller 98, which operates in a manner later to be described.

As before mentioned, the frame 43 is pivoted on the pivot 210 in line with the axis of the roller 44. Vertical rocking movement is applied to the frame 43 by means now to be described.

The elevator includes the standards 27, 28 and back plate 27' each of which carries an endless chain 100 traveling about upper sprockets 101 and lower sprockets 102. The sprockets 101 are rotated by means of chains 103 running over sprockets 104 on a shaft 105. The shaft 105 is rotated by means of a reduction gear 106 mounted on a bracket 107 on the standard 27. Reduction gear 106 is powered by a motor 108 having a shaft 109 coupled to the input shaft 110 of the reduction gear 106. Sprocket chains 103 connect sprockets 104 and sprockets 111 on the stub shafts 112 of the sprockets 101. Carriers 113 are mounted on the chains 100 at spaced intervals and are maintained in desired position by a pair of bellcrank levers 115, one at each end of a carrier 113 and each having arms 116 and 117, on which are respectively rollers 118 and 119 at the ends of the crank arms. The rollers 119 ride in grooves 121 during movement in the load carrying position to keep the carriers 113 horizontal, and with the crank arm 117 horizontal. On the return trip the bellcrank lever 115 swings and the arm 116 becomes horizontal, the arm 117 becomes vertical and the carriers 113 turn to a vertical position shown as 113' for the return trip.

When the carriers 113 are ascending, in horizontal positions, all the drive directions above noted are reversed.

The carriers 113 are alike and each includes a rear frame member 122 and side frame members 123 and 124, allochirally arranged. The side frame members 123, 124 are respectively connected to the chains 100 by means of stub shafts 125 and 126, affixed to said side frames. The stub shafts 125 and 126 also have the bellcrank levers 115 affixed thereto. Rollerway fingers 127 and 128 are affixed to the rear frame member 122 and extend forwardly parallel to the side frame members 123 and 124. The fingers 127 are provided with idler rollers 129. The fingers 128 are provided with rollers 130 adapted to be power driven. Power is applied to the rollers 130 by means of the power driven roller 68 which engages the end roller 130 of a series. The rollers 129 are rotatably mounted in rails 132. Rollers 130 are rotatably mounted in rails 133. Rollers 131 are mounted in oversize openings 134 and are urged toward the rollers 130 by means of springs 135 engaging under the pivot mounting 136 of rollers 131 and over the pivot mountings 137 of the rollers 130 all as described above for the rollers 46 and 59.

Figure 10:
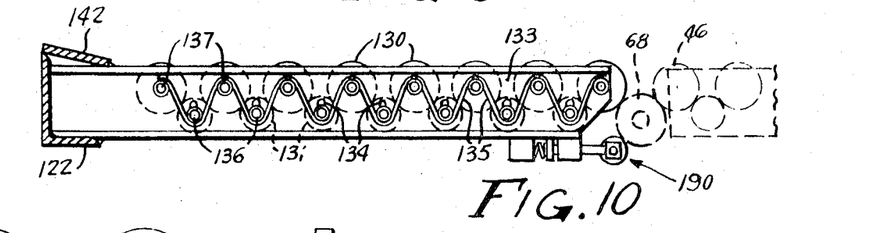
FIG. 10 is a fragmentary view taken on the line 10–10 of FIG. 8, showing the means for powering the rollers of the fingerlike rollerways.
Figure 11:
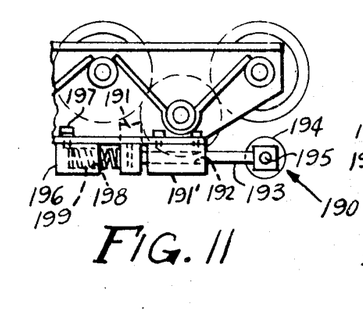
FIG. 11 is a fragmentary elevation showing brake means to prevent rotation of the rollers on the carrier.
Figure 12:
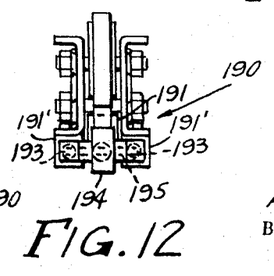
FIG. 12 is an end view of same.
Figure 13:
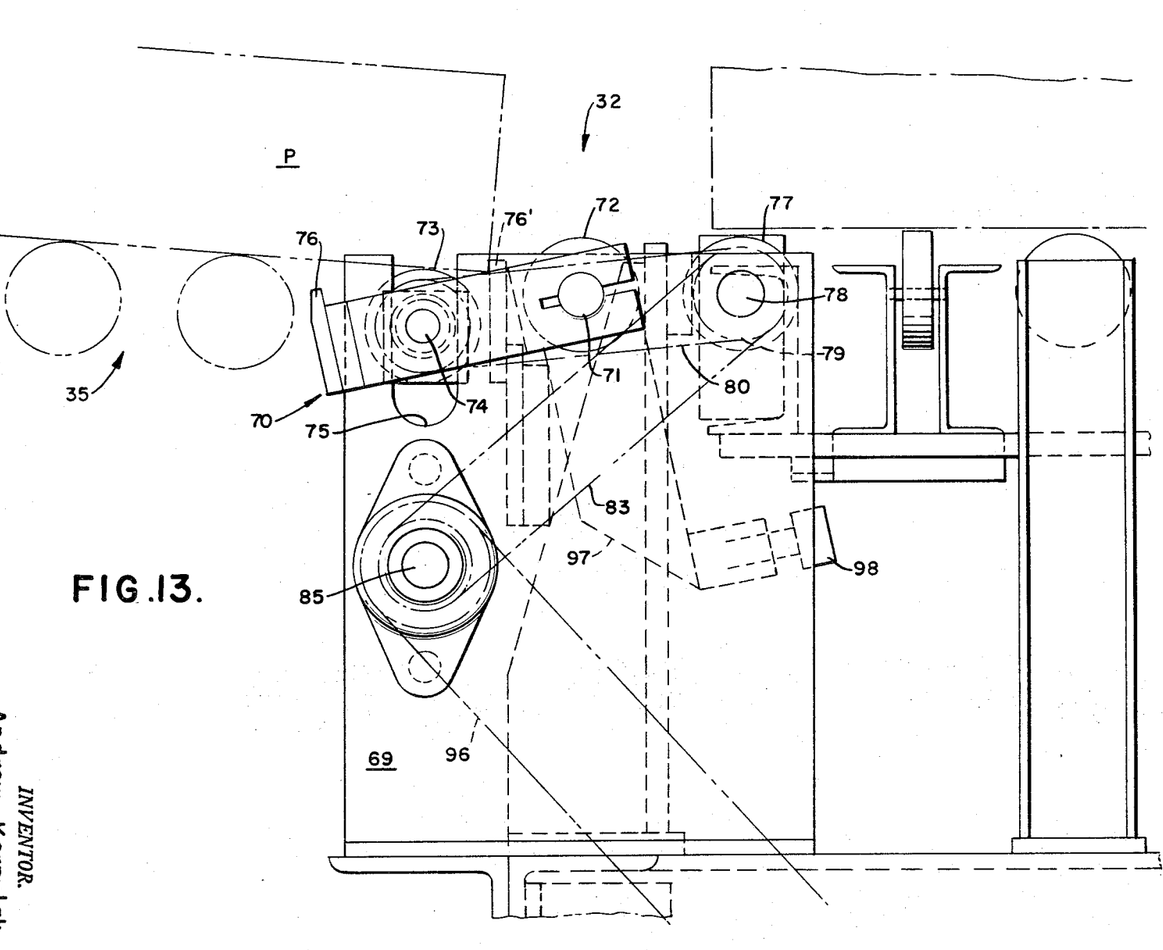
FIG. 13 is an enlarged side elevation showing portions of FIG. 5.

In the embodiment shown in FIGS. 1 to 5, the elevator operates to move the carriers 113 downwardly, though it is within the purview of this invention to move them upwardly, and reverse the whole cycle, as will later appear. Each side frame member 123, 124 carries at its free end a cam roller 138 which engages between spaced fingers 139 and 140 movably mounted on the frame 43. Downward movement of the shelf or carrier 113 causes the frame 43 to pivot about the axis of the roller 44, raising the fingers 37 and 39 upwardly between the rollers 36 to pick up any load carried thereon and engaged by the stop 141 adjustably mounted on the frame member 25. Since the rollers 46 are powered, the load will be moved transversely to its original path toward a carrier 113. Engagement of the cam roller 138 between the fingers 139, 140 also brings the powered roller 68 into engagement with the forwardmost roller, FIG. 10, of the finger 128. This causes the rollers 130 to rotate carrying the load onto the carrier 113 to the stop 142 on the rear frame member 122.

Roller 68 is provided with trunnions 143, mounted in an angled slot 144 in a bracket 145 affixed to the end of the outermost rollerway 41. The roller 68 is spring urged toward the roller 46 on the rollerway 42, and the roller 130 on the finger 128 by means of a spring urged bracket 145 pivoted on the pivot pin 189 the axis of which is in line with the axis of the final roller 46 in the frame rollerway 42. The bracket 145 is substantially triangular and the pivot point is near one base angle; the journal of the roller 68 being adjacent the other base angle. Adjacent the apex, the spring yoke 146 is mounted by means of a pin 147. A rod 148 extends from the spring yoke 146 through a suitable opening in a bracket 149 and has a suitable nut 150 thereon. A helical spring 151 surrounds the rod 148 to urge the bracket 145 to the left in FIG. 3.

Control of the fingers 139 and 140 from engaging position to travel position and thence to disengaging position is effected by a control rod 152 pivoted to the frame at 153 and to the finger 140 at 154. The fingers 139 and 140 are slidably mounted on the rocking frame 43 by means of a grooved plate 155 and are interconnected by a link 156 pivoted at 157 on the frame 43. Link 156 has elongated openings 158 and 159, respectively for pins 160 and 161 on the fingers 139 and 140, respectively. Antifriction rollers 162 are located between the fingers 139 and 140 to make the operation thereof smooth.

The tilting or oscillating movement is controlled by a fluid pressure device 163 having a cylinder 164 pivoted at 165 on a bracket 166. The fluid pressure device 163 has fluid connections 220 and 221 controlled by a motor driven valve V which can connect inlet 222 with either line 220 or 221, and can connect the other line 221 or 220 with the atmosphere at 223. Such valves are well known and the structure thereof forms no part of the present invention.

Figure 1:
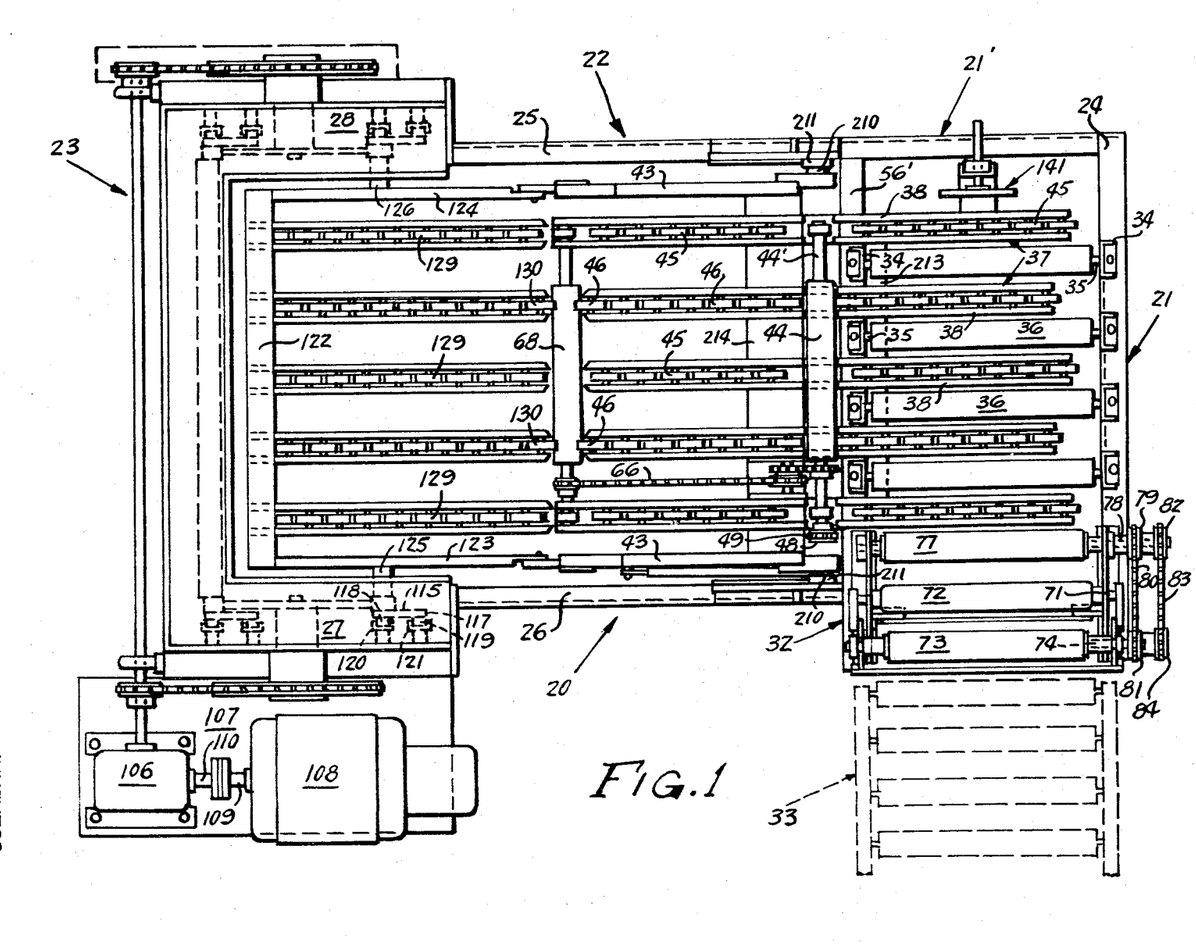
FIG. 1 is a plan view of the material handling system.
Figure 2:
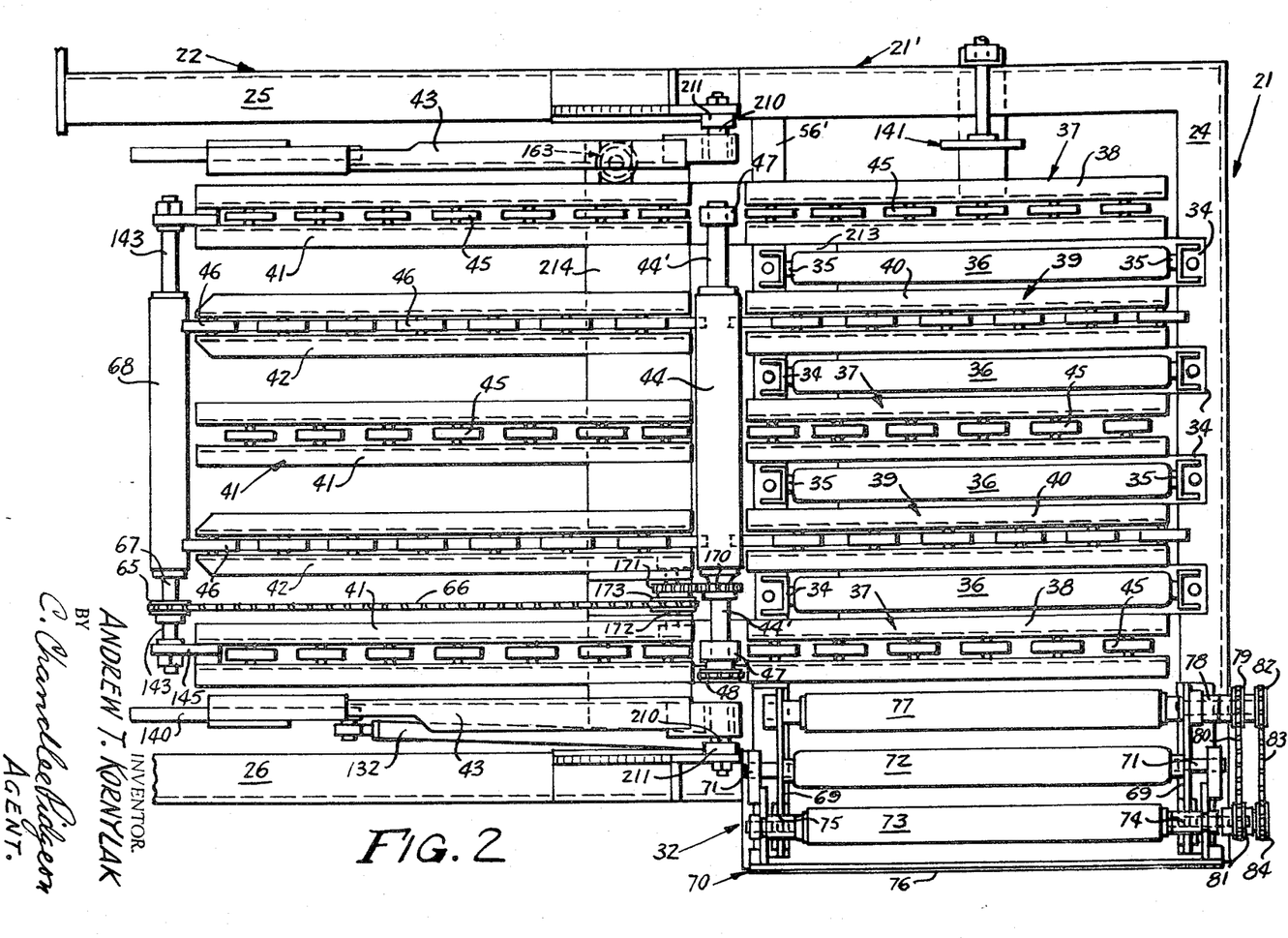
FIG. 2 is a portion of FIG. 1 on a somewhat larger scale.
Figures 3, 4:
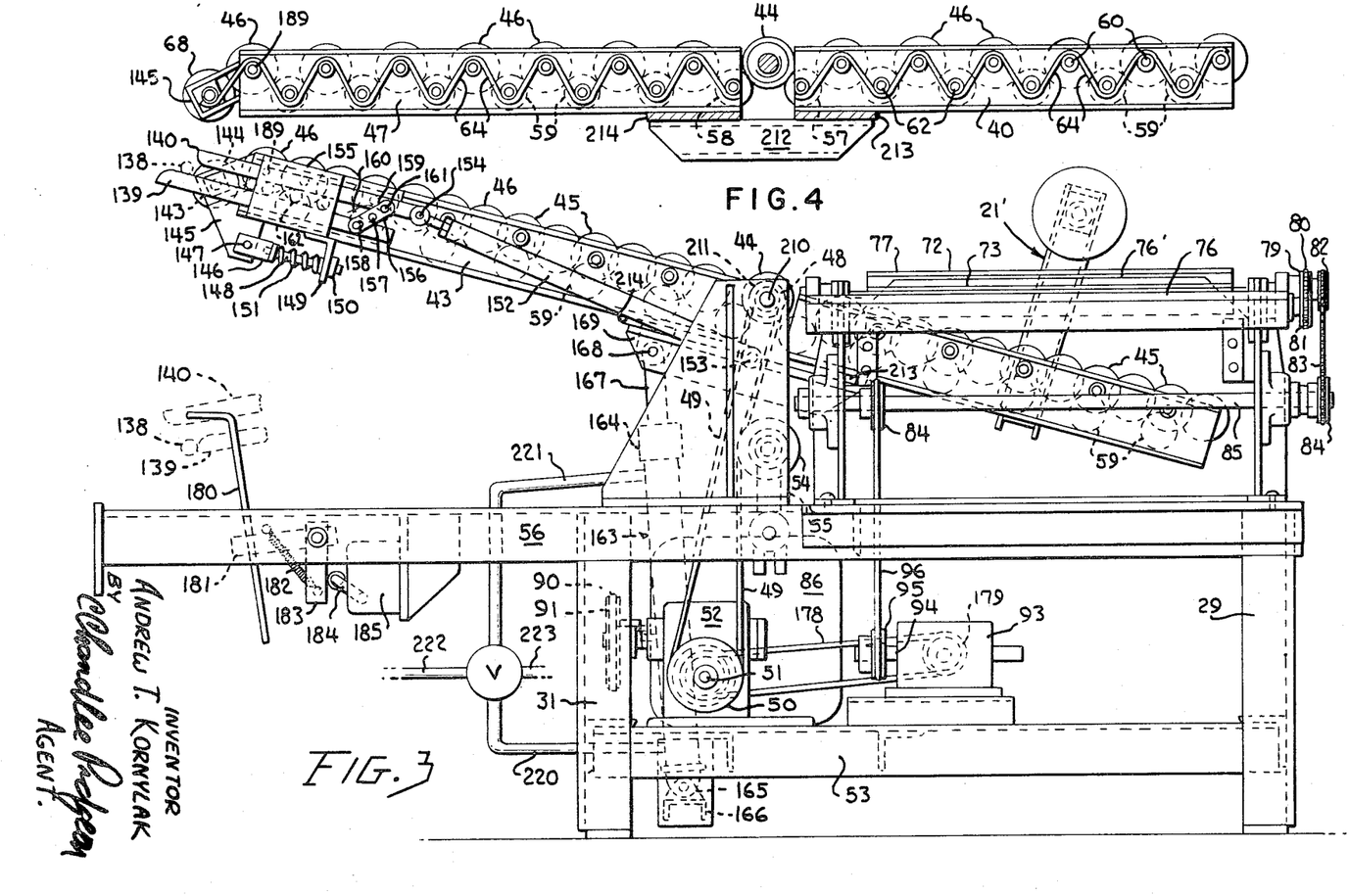
FIG. 3 is an elevation of the portion shown in FIG. 2.
FIG. 4 is a fragmentary elevation of a single rollerway as shown in FIGS. 1—3, showing the means for powering the rollers.
Figure 5:
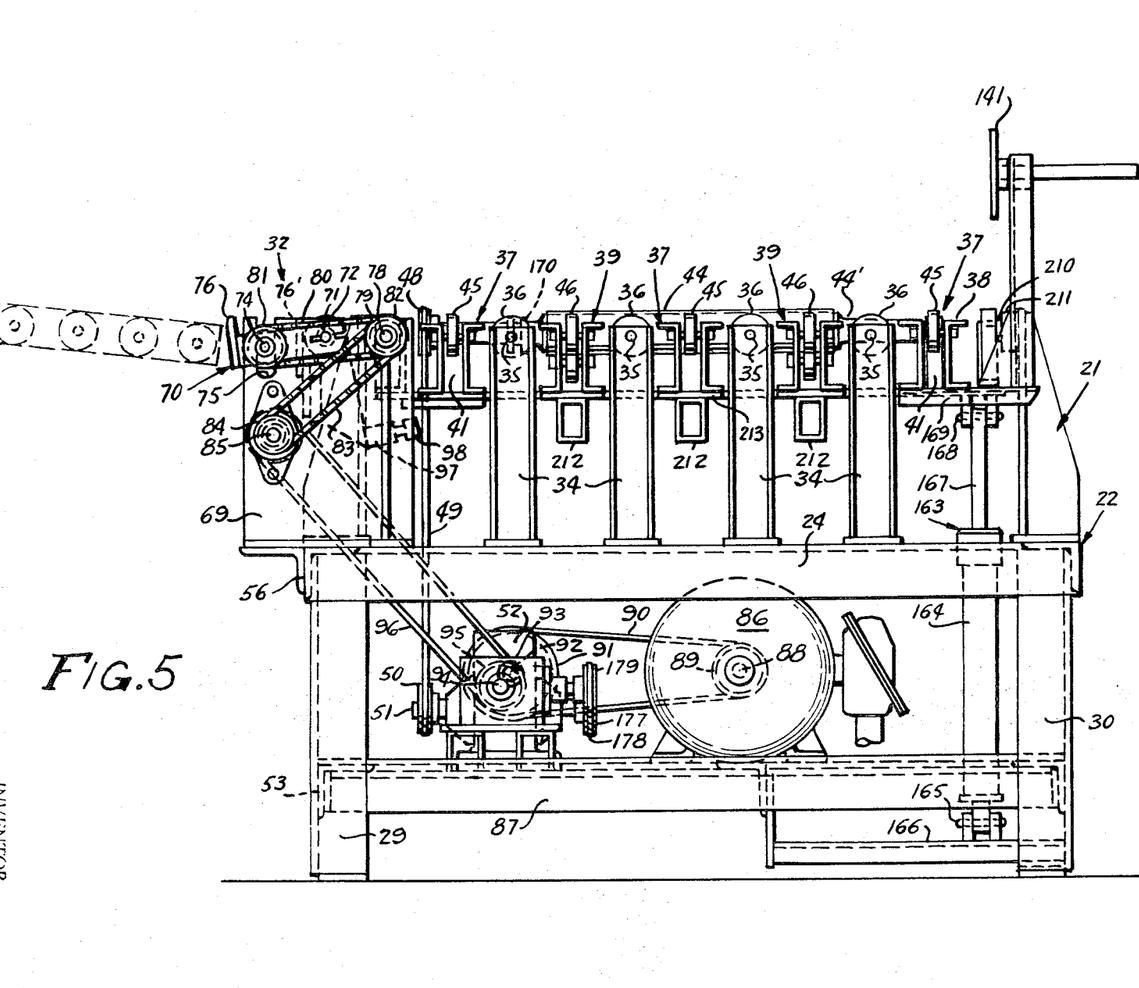
FIG. 5 is a right end elevation of the structure shown in FIGS. 1—3.

The roller 98 on the L-shaped arm 97 is in position to be engaged by a rollerway channel on the frame 43 when said frame is rocked to the position shown in FIG. 3. This causes lifting of the roller 74 and the package stop 76, to cause a package P resting against the package stop 76' to be lifted over said package stop and forwarded by means of the power driven rollers 73 and 77 to the rollers 36 to come to rest against the end stop 141.

Whenever the elevator is operating, the rocking frame 43 will be tilted back and forth through an angle of about 30°. The tilting in a counterclockwise direction in FIG. 3, is occasioned by the cam roller 138 on the downwardly moving carrier 113 engaging the finger 139 and the roller 138 being firmly gripped by the fingers 139 and 140 during a portion of movement of the frame 43. Tilting of the frame 43 causes the finger 139 to move to the right and finger 140 to move to the left, in FIG. 3, until they reach the position shown in dotted lines releasing the cam roller 138 and permitting the frame 43 to be returned in a clockwise direction to the starting position. This causes the cam roller 98 to move downward to elevate the powered roller 73 and the package stop 76 lifting the package P over the stop 76' to be forwarded toward the end stop 141. The contact of a cam roller 138 with the fingers 139 and 140 causes the powered rollers 46 in the rollerways 40 to pick up the package P and operate to forward same toward the carriers 113. This movement also causes the powered rollers 130 in the rollerway fingers 128 to be rotated by means of the spring urged power driven roller 68 in the end of the frame 43. By this means the package is conveyed onto the carrier 113 to rest against the stop 142. After each package P has been transferred to the carrier or shelf 113, the single package forwarding conveyor 32 is operated to release another package to be picked up.

To prevent movement of a package P on the carrier or shelf 113 after loading thereon, a brake 190 operates to lock the rollers 131. The brake 190 comprises blocks 191' mounted on the rollerway fingers 128. A cylindrical bore 192 in the block 191' accommodates a plunger or rod 193, which passes through the block 191'. A cam roller 194 is mounted on one end of the rod 193 by means of the pin 195. The brake block 191 is mounted on the other end of the rod 193, and is spring urged toward a roller 131. The block 196 is fixed to the frame of the rollerway finger 128 by means of a screw 197. The block 196 has a bore 198 to accommodate a helical spring 199 which bears against the brake block 191 to urge same against the roller 131. When the rocking frame 43 and the rollerways 42 interconnect with the carrier 113, by means of the roller 138 and the fingers 139 and 140, the same roller 194 engages the end of the rollerway 42 to push the brake block 191 away from the roller 131 to allow same to be rotated by the roller 68 engaging roller 130.

Unloading of the carriers 113 may be accomplished by means of a roller conveyor 175 having a plurality of fingers adapted to interdigitate with the fingers 127 and 128 of the carriers 113, if the carriers 113 are moving downward all the time. The load or package picked off by the conveyor 175 may be transferred by gravity to the conveyor 176 of any suitable type. The conveyor 175 may be of any suitable type, preferably similar to the interdigitating portion of the conveyor 21, and may even be an extension of the conveyor 176.

Should the carriers 113 be continuously moving upward, all direction of rotation and movement hereinbefore described would be reversed.

Let us now assume that the drive for the chains 100 has been reversed, and that the carriers 113 are moving upwardly. Any load placed on the conveyor 175 will be picked up by the finger rollerways 128 on a carrier 113. In order for the rocking frame 43 to be operated to pick up the load, as above noted, having been deposited on the rollerways 128 of a carrier 113, a sensing device S is of any suitable known type such as a photo cell or a micro switch, which may be caused to operate by any suitable means, such as the cam roller 138. The sensing device S will be connected to the usual control panel 200, for the entire machine, and will cause operation of the motor operated valve V to place the rocking frame in the former release position, shown in dotted lines in FIG. 3. In this position, the cam roller 138 will engage the finger 140 and start lifting the rocking frame 43. Before this operation, reverse rotation of the rollers 44 and 68 will have been effected. Thus during upward movement of the carrier 113 and the rocking frame 43, the rollers 130 on the rollerways 128 are rotated to remove the load from the carrier 113. When the carrier 113 and the rocking frame 43 have reached the position shown in full lines, FIG. 3, the finger 140 is disengaged from the cam roller 138. During movement of the carrier 113 and the rocking frame 43, the load on the carrier 113 has been removed therefrom, as shown by the arrows in FIG. 17. Suitable timing means in the control panel cause operation of the valve V to put the rocking frame in position for the next cycle of operation.

Figure 6:
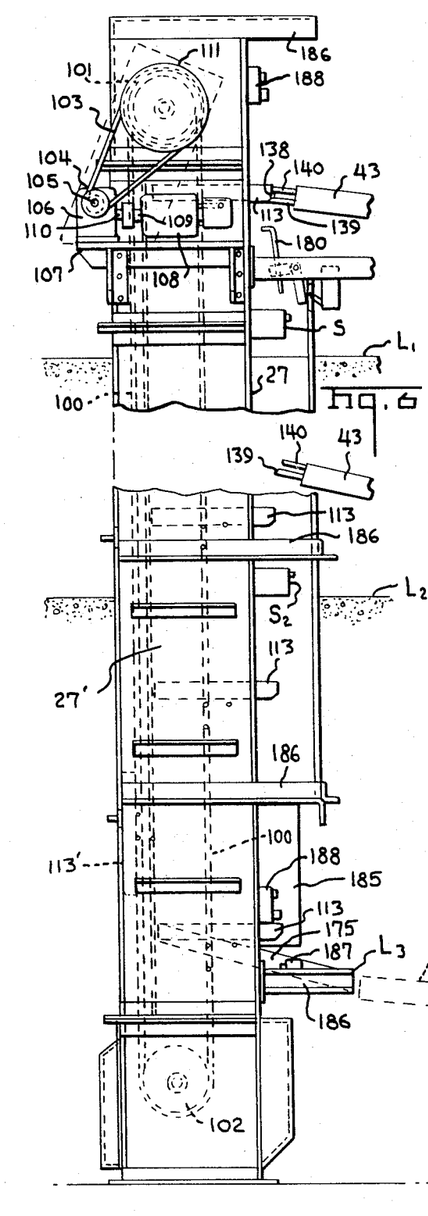
FIG. 6 is an end elevation of an elevator, the carriers being shown in outline only.
Figure 7:
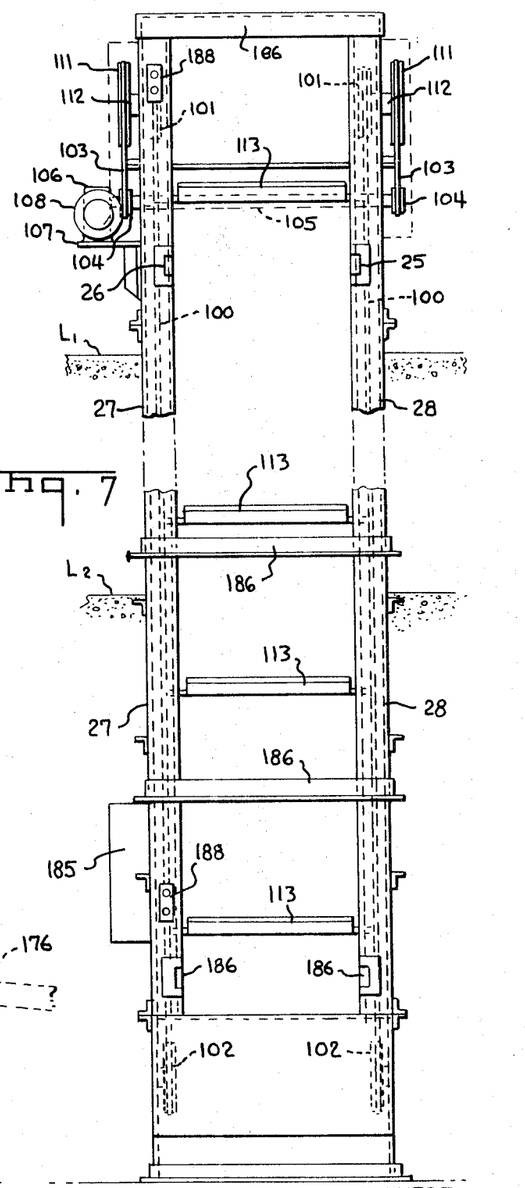
FIG. 7 is a front elevation of the elevator of FIG. 6.
Figure 8:
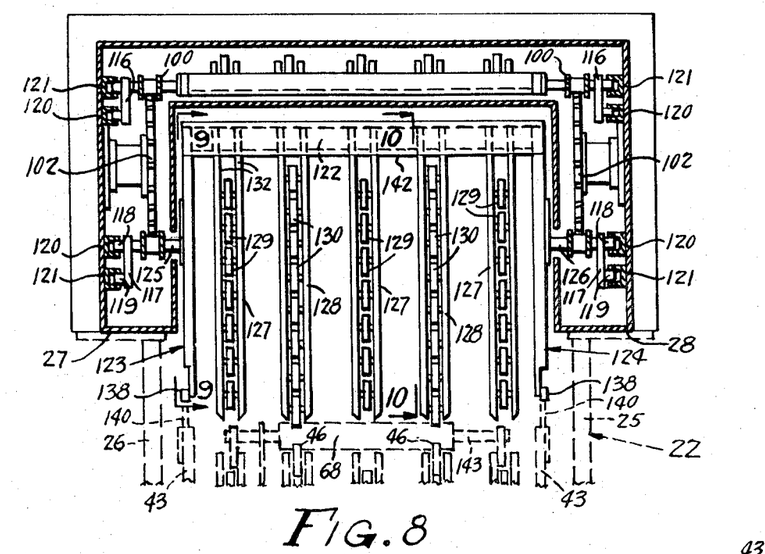
FIG. 8 is a fragmentary plan, partly in section of the elevator showing the fingerlike rollerways comprising a carrier and the means of cooperating with transfer means.
Figure 9:
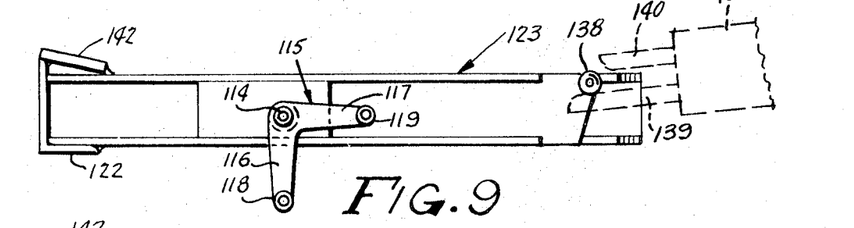
FIG. 9 is a partial elevation on the line 9–9 of FIG. 8 showing the means for turning the carriers endwise for the return trip of their endless path.

As the carriers 113 change from horizontal to vertical or vice versa at the upper and lower limits of travel, there is no point in describing loading a downwardly moving carrier at the lower level, or loading an upwardly moving carrier at the upper level. To show multilevel operation, an additional level $L_2$ is shown in FIG. 6.

Figure 15:
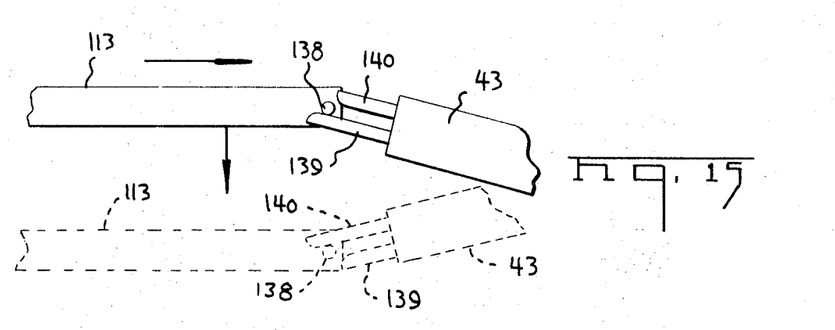
FIG. 15 is a diagrammatic representation of the same parts when unloading a descending carrier.

For unloading a descending carrier 113, the rocking frame 43 has fingers 139 and 140 engageable with cam roller 138 before described, and as shown in FIG. 15.

In its position at level $L_2$, the rocking frame 43 operates in a manner, under certain circumstances, not possible at uppermost or lowermost levels. A sensing device $S_1$, of known type, operates through the control panel to rotate the valve V and cause the rocking frame 43 to be in position for the finger 139 to engage the cam roller 138. The rollers 44 and 68 have had their direction of rotation set for removal of loads. During movement of the carrier 113 and the rocking frame 43, the rollers 130 are rotated to remove a load from the carrier 113 and place it on the rocking frame 43, as shown in FIG. 17.

For loading an ascending carrier 113 at level $L_2$, the operation of the rocking frame 43 is reversed from that just described. The sensing device $S_2$ operates through the control panel to set the rocking frame 43 in position for the finger 140 to be engaged by the cam roller 138 so that the rocking frame 43 and the carrier 113 move in unison. The direction of rotation of the rollers 44 and 68 is such that the rollers 46 and 130 rotate in the direction to feed the load onto the rollerways 128 of the carrier 113 as shown by the arrows in FIG. 16.

It has been noted that there is no point in loading an ascending carrier 113 at the uppermost level. Neither is there any point in loading a descending carrier 113 at the lowermost level. Between the uppermost level and the lowermost level, the carriers 113 turn from the normal horizontal position to the position 113', adjacent the rear of the frames 27, 28, there being crossovers for the tracks 120, 121 as shown in my U.S. Pat. No. 3,365,052 issued Jan. 23, 1968.

Figure 16:
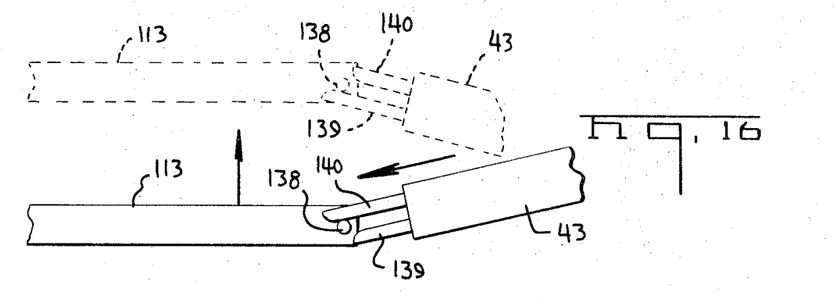
FIG. 16 is a diagrammatic representation of the same elements when loading an ascending carrier.
Figure 17:
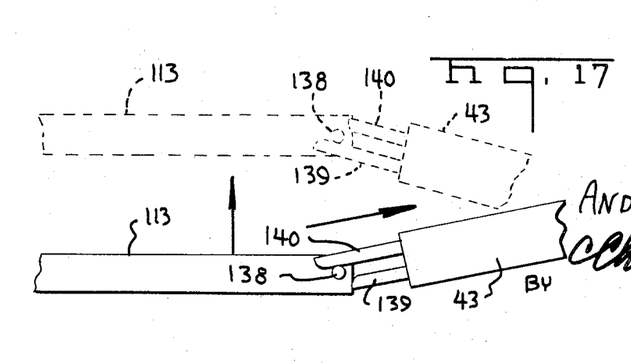
FIG. 17 is a diagrammatic representation of the same parts when unloading an ascending carrier.

The loading of an ascending carrier at any intermediate position is diagrammatically shown in FIG. 16, and the unloading of a carrier in such situation is shown in FIG. 17.

Figure 14:
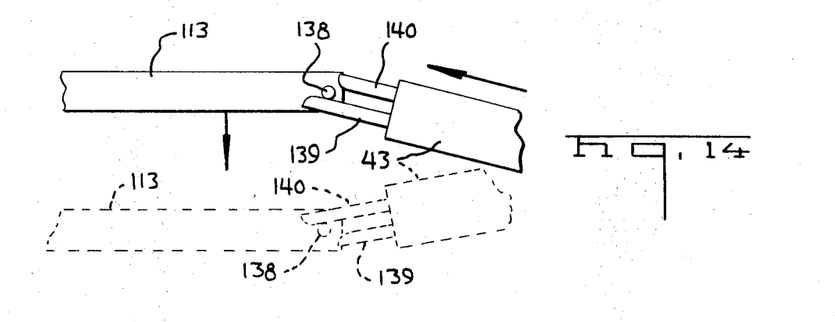
FIG. 14 is a diagrammatic representation of certain elements when loading a descending carrier.

The loading of a descending carrier is shown diagrammatically in FIG. 14, and the unloading of such a carrier is shown in FIG. 15.

Arrows placed on FIGS. 14, 15, 16 and 17 show directions of movement of the carrier, the rocking frame and the load.

In FIG. 18, I show a modification of the device wherein there is no physical connection between the carrier and the elevator. Here, the carrier 213 may be like the carriers 113, above described, or any other design, such as are disclosed in my U.S. Pat. No. 3,365,052, issued Jan. 23, 1968. At or adjacent the forward end of the carrier 213, there is a signal emitter 250. The signal emitter may be any of a number of well known devices such as a light beam, a magnet, an electric field generator, etc. On the adjacent end of the pivoted conveyor 243, there is a suitable transducer 260 which receives energy and converts it to an electric potential and passes it to an amplifier and relay 262 by means of the line 261. A line 263 carries an e.m.f. from the amplifier and relay 262 to the power device 264. The power device 264 has a piston rod 265 connected with the conveyor 243 to cause the same to oscillate or pivot about the axis 270 when a signal is emitted from the emitter 250.

The signal emitter 250 is preferably under control of and automatically operated by the control panel 200.

Safety features are included as follows:

Should a package not be properly placed on a shelf or carrier 113 and project forwardly, it will contact a limit switch arm 180 mounted on the arm 181 of a bellcrank lever 182, having another arm 183, and turn the bellcrank lever against the tension of the spring rotating the lever 182 counterclockwise, FIG. 3, so that the arm 183 will move the trip arm 184 of the microswitch 185 suitably mounted on the frame member 56, to shut down the system. Guards 186 are conveniently placed in front of the elevator to prevent the likelihood of personnel stepping into the floor opening or against a carrier. If a package having passed the trip arm 180 gets to such a position that it may not go through the floor opening or may not properly engage the conveyor 175, it will contact the microswitch 187 to shut down the system. Manual control of the system is had by means of one or more duplicate pushbutton stations 188 suitably mounted for access by operating personnel.

Having described my invention in a preferred form, I desire it to be understood that various changes and modifications may be made within the skill of the art and the scope of the appended claims.

I claim:

1. In a material handling system, an elevator comprising a plurality of spaced apart carriers moving in a closed path, means maintaining said carriers horizontal during movement in load carrying direction, and means causing them to turn into a vertical position during the return movement, an oscillating transfer conveyor, said transfer conveyor comprising a rocking frame pivoted intermediate its ends and having conveyor rollers on opposite sides of said pivot point, driving roller means having its axis coaxial with the pivotal axis of said rocking frame, driving connections between said conveyor rollers and said roller means to rotate said conveyor rollers, conveyor rollers on said carrier, means on said carrier and on said rocking frame engaging to cause pivoting of the rocking frame in response to the vertical motion of the carrier, and driving means on said rocking frame engaging the conveyor rollers on said carrier to drive same.

2. The system as defined in claim 1 wherein the engaging means on a carrier comprises a cam roller and wherein the means on the rocking frame comprises parallel reciprocating fingers movable so that at least one thereof engages the cam roller at one extreme of oscillation of the rocking frame and frees the cam roller at the other extreme of oscillation of the rocking frame.

3. The system as defined in claim 2 wherein the fingers comprise longitudinally movable parallel bars, a lever pivoted intermediate its ends between said bars, said lever being loosely connected adjacent its ends to the bars.

4. The structure as defined in claim 2 wherein the fingers comprise spaced parallel bars, one above the other, on the end of the rocking frame, the lower one being positioned to engage the cam roller on a descending carrier, when the rocking frame is in its uppermost position, and wherein the upper one is in position to engage the cam roller on an ascending carrier, when the rocking frame is in its lowermost position.

5. The system as defined in claim 1 including a control assembly for controlling the direction of movement of said carriers and the rotation of said means driving conveyor rollers.

6. The system as defined in claim 4 including a control assembly for determining the positioning and direction of movement of the rocking frame.

7. A material handling mechanism for transferring material between a vertically movable conveyor and a supporting conveyor comprising an oscillating transfer conveyor, means intermediate the ends of the transfer conveyor pivotally mounting said transfer conveyor for vertically swinging motion, said supporting conveyor including means at one end of the transfer conveyor for supporting an article within the arc of oscillation of said one end of the transfer conveyor while said end is below said supporting conveyor, interengaging means on said vertically movable conveyor and the other end of the transfer conveyor for pivoting said transfer conveyor in response to vertical motion of the vertically movable conveyor, the pivoting of the transfer conveyor causing interfingering of the transfer conveyor with the supporting means to thereby transfer an article therebetween, means for disengaging said interengaging means at the end of the arc of oscillation, and means for returning the transfer conveyor to the other end of the arc of oscillation.

8. A material handling mechanism as defined in claim 7 wherein the vertically movable conveyor comprises a plurality of spaced apart carriers moving in a closed path, means maintaining said carriers horizontal during movement in load carrying direction, and means causing them to turn into a vertical position during the return movement, said transfer conveyor comprising a frame pivoted intermediate its ends and having conveyor rollers on opposite sides of said pivot point, power driven roller means having its axis in line with the pivotal axis of said rocking frame, driving connections between said conveyor rollers and said roller means to rotate said conveyor rollers, conveyor rollers on said carrier, and drive means on said rocking frame engaging conveyor rollers on said carrier to drive same.